(12) United States Patent
Seiki et al.

(10) Patent No.: US 9,248,399 B2
(45) Date of Patent: Feb. 2, 2016

(54) $CO_2$ RECOVERY SYSTEM

(71) Applicant: MITSUBISHI HEAVY INDUSTRIES, LTD., Tokyo (JP)

(72) Inventors: Yoshio Seiki, Tokyo (JP); Kouji Horizoe, Tokyo (JP); Atsuhiro Yukumoto, Tokyo (JP); Haruaki Hirayama, Tokyo (JP); Masaki Yushima, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/413,770

(22) PCT Filed: Jul. 11, 2013

(86) PCT No.: PCT/JP2013/069027
§ 371 (c)(1),
(2) Date: Jan. 9, 2015

(87) PCT Pub. No.: WO2014/013938
PCT Pub. Date: Jan. 23, 2014

(65) Prior Publication Data
US 2015/0135960 A1    May 21, 2015

(30) Foreign Application Priority Data
Jul. 20, 2012    (JP) .................................. 2012-161239

(51) Int. Cl.
*B01D 53/14*    (2006.01)
*B01D 53/62*    (2006.01)
*C01B 31/20*    (2006.01)

(52) U.S. Cl.
CPC ........ *B01D 53/1475* (2013.01); *B01D 53/1425* (2013.01); *B01D 53/62* (2013.01); *C01B 31/20* (2013.01); *B01D 2258/0283* (2013.01); *Y02C 10/04* (2013.01); *Y02C 10/06* (2013.01)

(58) Field of Classification Search
CPC ................... B01D 2258/0283; B01D 53/1425; B01D 53/1475; B01D 53/62; C01B 31/20; Y02C 10/04; Y02C 10/06
See application file for complete search history.

(56) References Cited

U.S. PATENT DOCUMENTS

| 4,160,810 A | 7/1979 | Benson et al. |
| 5,853,680 A * | 12/1998 | Iijima et al. .................... 423/220 |
| 2012/0067059 A1* | 3/2012 | Katz et al. ........................ 60/780 |

FOREIGN PATENT DOCUMENTS

| EP | 0270040 A2 * | 6/1988 | ................ C01B 3/02 |
| JP | 54-155172 A | 12/1979 | |

(Continued)

OTHER PUBLICATIONS

English Translation of Written Opinion dated Oct. 15, 2013, issued in corresponding International Application No. PCT/JP2013/069027 (5 pages).

(Continued)

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

Provided is a $CO_2$ recovery system including: a high-pressure absorption tower; a high-pressure regeneration tower that partially regenerates a $CO_2$ absorption solution from the absorption tower through a first liquid feed line; a second liquid feed line that extracts a semi-lean solution having a heat resistance temperature thereof or lower from the high-pressure regeneration tower and introduces a portion of the semi-lean solution into a middle stage of the high-pressure absorption tower; a branch line that introduces a rest of the semi-lean solution into a flash drum; a third liquid feed line that introduces a lean solution after adding pressure thereto into a top of the high-pressure absorption tower; a high-pressure $CO_2$ compression device where high-pressure $CO_2$ gas from the high-pressure regeneration tower is introduced; and a low-pressure $CO_2$ compression device where low-pressure $CO_2$ from the flash drum is introduced.

2 Claims, 3 Drawing Sheets

(56) References Cited

FOREIGN PATENT DOCUMENTS

| JP | 63-151330 A | 6/1988 |
|----|----|----|
| JP | 08-080421 A | 3/1996 |
| JP | 09-100478 A | 4/1997 |
| JP | 2002-126439 A | 5/2002 |
| JP | 2011-162385 A | 8/2011 |
| WO | 2010/136425 A1 | 12/2010 |

OTHER PUBLICATIONS

International Search Report dated Oct. 15, 2013, issued in corresponding application No. PCT/JP2013/069027.

Written Opinion dated Oct. 15, 2013, issued in corresponding application No. PCT/JP2013/069027.

* cited by examiner

CO₂ RECOVERY SYSTEM

TECHNICAL FIELD

The present invention relates to a $CO_2$ recovery system that absorbs $CO_2$ from gas and reduces $CO_2$ compression power.

BACKGROUND ART

As one of the causes of global warming, the greenhouse effect by $CO_2$ has been identified, and a countermeasure thereof is urgently required internationally from the viewpoint of protecting the global environment. Sources of $CO_2$ emission spread over various fields of human activity where fossil fuel is burned, and demand on emission reduction of $CO_2$ tends to increase. As a result, for power generation facilities such as a thermal power plant where a large amount of fossil fuel is used, a $CO_2$ recovery method has been actively studied in which flue gas of a boiler is brought into contact with an amine-based absorption solution such as an aqueous amine compound solution so as to remove and recover $CO_2$ from the flue gas.

In the related art, PTL 1 discloses an amine recovery process in which an amine compound accompanying decarbonated flue gas, from which $CO_2$ has been absorbed and removed by gas-liquid contact with an absorption solution, is sequentially recovered in plural stages of water-washing sections that are provided for bringing the decarbonated flue gas into gas-liquid contact with a washing solution to recover the amine compound.

In addition, in the related art, PTL 2 discloses a configuration including: a cooling unit that cools decarbonated flue gas from which $CO_2$ has been absorbed and removed by gas-liquid contact with an absorption solution; and a contact unit that brings condensate, which has been condensed in the cooling unit, into counterflow contact with the decarbonated flue gas. Further, PTL 2 discloses a configuration including a water-washing section in which an amine compound accompanying decarbonated flue gas is recovered. In this configuration, condensate, which has been condensed in a cooling tower in which flue gas is cooled before $CO_2$ is recovered therefrom, is used as washing water.

CITATION LIST

Patent Literature

[PTL 1] Japanese Unexamined Patent Application Publication No. 2002-126439
[PTL 2] Japanese Unexamined Patent Application Publication No. 8-80421

SUMMARY OF INVENTION

Technical Problem

However, recently, from the viewpoint of protecting the environment, when a $CO_2$ recovery device is installed to process flue gas in, for example, a thermal power plant where the flow rate of gas to be processed is high, the amount of $CO_2$ to be removed is large. Therefore, for example, when the $CO_2$ recovery device is buried in the ground, it is desired to reduce power relating to $CO_2$ compression in a $CO_2$ recovery plant.

The present invention has been made in order to solve the above-described problems, and an object thereof is to provide a $CO_2$ recovery system that absorbs $CO_2$ from gas and reduces $CO_2$ compression power.

Solution to Problem

According to a first aspect of the present invention for solving the above-described problems, there is provided a $CO_2$ recovery system including: a high-pressure absorption tower that brings high-pressure gas containing $CO_2$ into contact with a $CO_2$ absorption solution to remove $CO_2$ from the high-pressure gas; a high-pressure regeneration tower that liberates a portion of $CO_2$ from a $CO_2$-absorbed high-pressure rich solution, which has been introduced from the high-pressure absorption tower through a first liquid feed line, and partially regenerates the $CO_2$ absorption solution to obtain a semi-lean solution; and a branch line that branches the semi-lean solution extracted from a tower bottom portion of the high-pressure regeneration tower, in which the partially regenerated $CO_2$ absorption solution is extracted from the bottom portion of the high-pressure regeneration tower in a semi-lean solution state having a heat resistance temperature of the $CO_2$ absorption solution or lower, a portion of the extracted semi-lean solution is introduced into a middle stage of the high-pressure absorption tower through a second liquid feed line to be reused as the absorption solution, the rest of the extracted semi-lean solution is introduced into a flash drum through the branch line to obtain a normal-pressure lean solution, and the lean solution is pressurized and is introduced to the top of the high-pressure absorption tower through a third liquid feed line to be reused as the absorption solution, high-pressure $CO_2$ gas separated in the high-pressure regeneration tower is introduced into a $CO_2$ compression device having a predetermined compression pressure, and low-pressure $CO_2$ gas separated in the flash drum is introduced into a $CO_2$ compression device having a predetermined compression pressure.

According to a second aspect of the invention, the $CO_2$ recovery system according to the first aspect may further include: an inert gas separator that separates inert gas between the high-pressure absorption tower and the high-pressure regeneration tower; and an inert gas introduction line that introduces the separated inert gas into the high-pressure absorption tower.

Advantageous Effects of Invention

According to the present invention, in the high-pressure regeneration tower, the high-pressure rich solution is introduced at a predetermined compression pressure and is emitted from the tower bottom portion at a heat resistance temperature of the absorption solution or lower as the semi-lean solution obtained by liberating a portion of carbon dioxide ($CO_2$) from the high-pressure rich solution and partially regenerating the high-pressure rich solution. The separated high-pressure $CO_2$ gas having the desired pressure is introduced into a compressor of a $CO_2$ compression device that is provided on a gas flow downstream side of the high-pressure regeneration tower to compress $CO_2$. As a result, deterioration of an absorption solution is suppressed, compression power for compressing $CO_2$ gas, which is emitted from the high-pressure regeneration tower, can be significantly saved unlike the related art, and the size of compression facilities can be reduced.

DESCRIPTION OF EMBODIMENTS

Hereinafter, the present invention will be described with reference to the drawings. The present invention is not limited to the embodiment. In addition, in the case of plural embodiments, combinations of the respective embodiments are included in the present invention. In addition, components in the following embodiment include components which can be easily conceived by those skilled in the art, and substantially identical ones thereto.

Embodiment 1

A $CO_2$ recovery system according to an embodiment of the present invention will be described with reference to the drawings.

Figure 1:
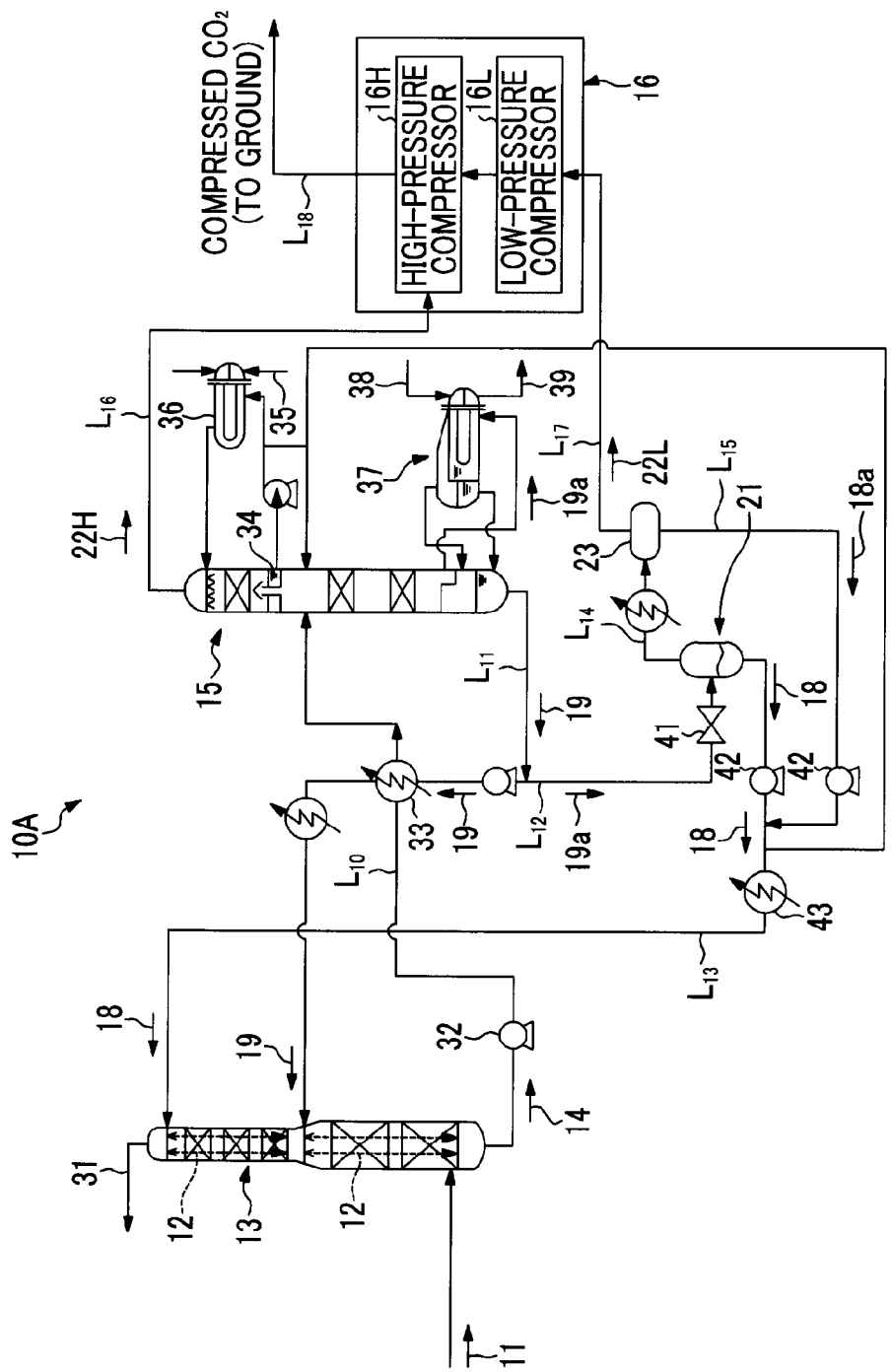
FIG. 1 is a schematic diagram illustrating a $CO_2$ recovery system according to Embodiment 1.
Figure 2:
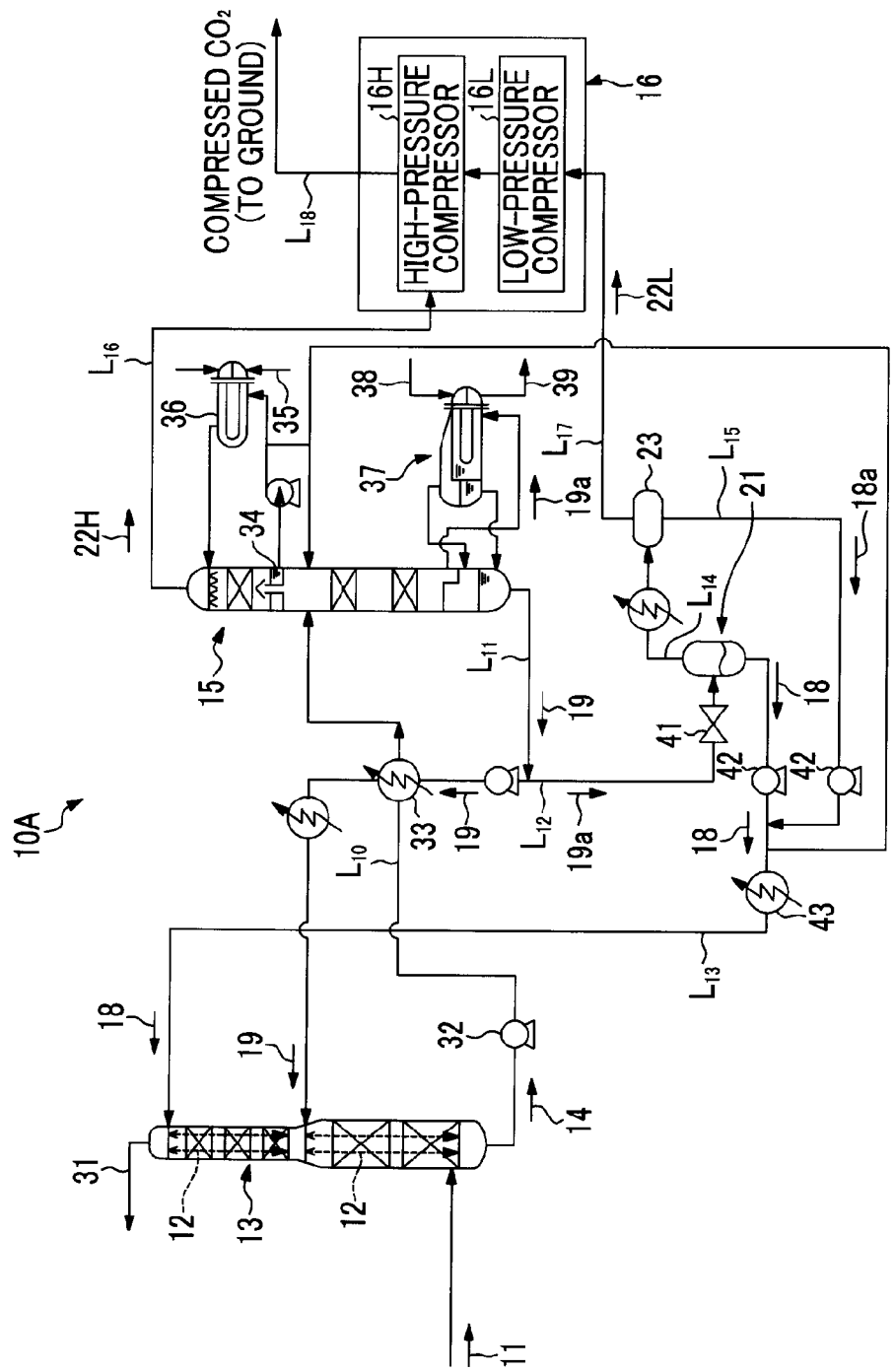
FIG. 2 is a schematic diagram illustrating the $CO_2$ recovery system according to Embodiment 1.

FIGS. 1 and 2 are schematic diagrams illustrating the $CO_2$ recovery system according to Embodiment 1. As illustrated in FIG. 1, a $CO_2$ recovery system 10A according to the embodiment includes: a high-pressure absorption tower 13 that brings high-pressure gas 11 containing $CO_2$ into contact with a $CO_2$ absorption solution 12 to remove $CO_2$ from the high-pressure gas 11; a high-pressure regeneration tower 15 that liberates a portion of $CO_2$ from a $CO_2$-absorbed high-pressure rich solution 14, which has been introduced into the high-pressure regeneration tower 15 from the high-pressure absorption tower 13 through a first liquid feed line $L_{10}$, and partially regenerates the $CO_2$ absorption solution to obtain a semi-lean solution 19; a second liquid feed line $L_{11}$ that feeds the semi-lean solution 19, which has been extracted from a tower bottom portion of the high-pressure regeneration tower 15, to the high-pressure absorption tower 13; a branch line $L_{12}$ that branches a portion 19a of the semi-lean solution 19 fed from the second liquid feed line $L_{11}$; and a flash drum 21 that is provided in a branch line $L_{12}$ and flashes the semi-lean solution 19. In the $CO_2$ compression recovery system, the partially regenerated $CO_2$ absorption solution is extracted from the bottom portion of the high-pressure regeneration tower 15 in the state of the semi-lean solution 19 having a heat resistance temperature of the $CO_2$ absorption solution or lower, the extracted semi-lean solution 19 is introduced into a middle stage of the high-pressure absorption tower 13 through the second liquid feed line $L_{11}$ to be reused as the absorption solution, the flash drum 21 flashes the portion 19a of the semi-lean solution branched in the branch line $L_{12}$ to obtain a normal-pressure lean solution 18, the lean solution 18 is pressurized and is introduced to the top of the high-pressure absorption tower 13 to be reused as the absorption solution, high-pressure $CO_2$ gas 22H which is a gas component separated in the high-pressure regeneration tower 15 is introduced into a high-pressure compressor 16H having a predetermined compression pressure, and low-pressure $CO_2$ gas 22L which is a gas component separated in the flash drum 21 is introduced into a low-pressure compressor 16L having a predetermined compression pressure.

In the high-pressure absorption tower 13, the high-pressure gas 11 containing carbon dioxide ($CO_2$) is brought into counterflow contact with the $CO_2$ absorption solution (amine solution) 12 containing, for example, alkanolamine as a base such that the $CO_2$ absorption solution 12 absorbs $CO_2$ from the high-pressure gas 11 and removes $CO_2$ from the high-pressure gas 11. The high-pressure rich solution 14 which is the $CO_2$-absorbed $CO_2$ absorption solution is regenerated in the semi-lean solution 19 state by a portion of $CO_2$ being liberated in the high-pressure regeneration tower 15.

Here, in FIG. 1, reference numeral $L_{13}$ represents a third liquid feed line that feeds the lean solution 18, which is separated in the flash drum 21, to the top of the high-pressure absorption tower 13, reference numeral $L_{14}$ represents a gas feed line that feeds the low-pressure $CO_2$ gas 22L from the flash drum 21 to a gas-liquid separator 23, reference numeral $L_{15}$ represents a liquid return line that returns a portion 18a of the lean solution 18, which has been recovered from the gas-liquid separator 23, to the third liquid feed line $L_{13}$, reference numeral $L_{16}$ represents a gas feed line that feeds the high-pressure $CO_2$ gas 22H from the top of the high-pressure regeneration tower 15 to the high-pressure compressor 16H, reference numeral $L_{17}$ represents a gas feed line that feeds the low-pressure $CO_2$ gas 22L from the gas-liquid separator 23 to the low-pressure compressor 16L, reference numeral $L_{18}$ represents an introduction line that introduces compressed $CO_2$, which has been compressed in a $CO_2$ compression device 16, into the ground, reference numeral 31 represents purified gas from which $CO_2$ has been removed, reference numeral 32 represents a liquid feed pump of the high-pressure rich solution 14 that is provided in the second liquid feed line $L_{11}$, reference numeral 33 represents a heat exchanger that exchanges heat between the high-pressure rich solution 14 and the semi-lean solution 19, reference numeral 36 represents a cooling condenser that cools steam condensate 34 on the top portion of the high-pressure regeneration tower with cooling water 35, reference numeral 37 represents a reboiler that reheats the portion 19a of the semi-lean solution 19, reference numeral 38 represents saturated steam that is supplied to the reboiler, reference numeral 39 represents the steam condensate, reference numeral 41 represents a pressure-reducing valve that is provided in the branch line $L_{12}$, reference numeral 42 represents a booster pump that pressurizes the lean solution 18, and reference numeral 43 represents cooling means for cooling the lean solution 18.

The high-pressure gas 11 is introduced into the high-pressure absorption tower 13, the $CO_2$ absorption solution 12 absorbs $CO_2$ contained in the high-pressure gas 11 to obtain the high-pressure rich solution 14, and the high-pressure rich solution 14 is emitted from the bottom of the high-pressure absorption tower 13. Next, the high-pressure rich solution 14 is fed to the high-pressure regeneration tower 15 by the liquid feed pump 32 and is regenerated in the semi-lean solution 19 state by a portion of $CO_2$ being liberated in the high-pressure regeneration tower 15.

Here, when the lean solution 18 is completely regenerated, the internal temperature of the high-pressure regeneration tower 15 is a heat resistance temperature (for example, 120° C.) of the absorption solution or higher. Therefore, it is necessary that the regeneration in the high-pressure regeneration tower 15 be limited to the partial regeneration and that the $CO_2$ absorption solution be emitted in the semi-lean solution 19 state.

As the high-pressure gas 11 containing $CO_2$, for example, high-pressure gas for fertilizer synthesis or high-pressure natural gas (gas pressure: for example, 3,000 kPaG) may be used.

Accordingly, the high-pressure rich solution 14 that has absorbed $CO_2$ in the high-pressure absorption tower 13 using the high-pressure gas 11 is introduced into the high-pressure regeneration tower 15 at a predetermined compression pressure and is emitted from the tower bottom portion as the semi-lean solution 19 which is partially regenerated from the high-pressure rich solution 14 by a portion of carbon dioxide ($CO_2$) being liberated from the high-pressure rich solution 14.

The high-pressure $CO_2$ gas 22H having the desired pressure (for example, 330 kPaG) which has been separated from the tower top portion of the high-pressure regeneration tower 15 is fed to the high-pressure compressor 16H of the $CO_2$ compression device 16 through the gas feed line $L_{16}$.

In the embodiment, the partially regenerated $CO_2$ absorption solution is extracted from the bottom portion of the high-pressure regeneration tower 15 in the semi-lean state having a heat resistance temperature (for example, 120° C.) of the $CO_2$ absorption solution or lower. Therefore, the absorption solution does not deteriorate.

The extracted semi-lean solution 19 is introduced into the middle stage of the high-pressure absorption tower 13 through the second liquid feed line $L_{11}$ to be reused as the absorption solution.

Here, it is preferable that the semi-lean solution be introduced into the middle stage of the high-pressure absorption tower 13 for the following reason: the lean-solution 18 introduced from the tower top partially absorbs $CO_2$ and is in the semi-rich state in the middle stage of the top, and the semi-lean-solution 19 introduced from the middle stage is the absorption solution having the same properties as the above semi-rich solution.

On the other hand, the portion 19a of the semi-lean solution 19 branched in the branch line $L_{12}$ is introduced into the flash drum 21 and is flashed to perform gas-liquid separation and to obtain the normal-pressure lean solution 18.

This lean solution 18 is pressurized by the booster pump 42 and is introduced from the tower top of the high-pressure absorption tower 13 to be reused as the absorption solution.

Since the amount of the lean solution 18 introduced from the tower top portion of the high-pressure absorption tower 13 is small, the size of a tower body on the upper side of the high-pressure absorption tower 13 can be reduced, and the size of the absorption tower can be reduced.

Here, regarding the amount of the semi-lean solution branched, a molar ratio of the amount of the semi-lean solution introduced to the high-pressure absorption tower 13 to the amount of the semi-lean solution branched is about 8:2.

The portion 19a of the branched semi-lean solution is used for gas-liquid separation in the flash drum 21. The separated low-pressure $CO_2$ gas 22L is fed to the gas-liquid separator 23 through the gas feed line $L_{14}$. In this gas-liquid separator 23, the absorption solution accompanying the gas during flashing is separated as the lean solution 18, and the lean solution 18a is fed to the low-pressure compressor 16L through the gas feed line $L_{17}$. The lean solution 18 which is the separated absorption solution is returned to the third liquid feed line $L_{13}$ for feeding the lean solution.

FIG. 2 is a schematic diagram illustrating the $CO_2$ recovery device to describe a temperature and a pressure of gas according to an example of the embodiment.

The high-pressure rich solution 14 is introduced into the high-pressure regeneration tower 15 and is converted into a partially regenerated absorption solution by a portion of $CO_2$ being liberated. This partially regenerated absorption solution is emitted as the semi-lean solution 19 from the bottom portion of the high-pressure regeneration tower 15 at a heat resistance temperature (for example, 120° C.) of the absorption solution or lower.

From the tower top of the high-pressure regeneration tower 15, the liberated high-pressure $CO_2$ gas 22H containing 93% of the total amount of $CO_2$ is fed to the high-pressure compressor 16H at a gas pressure of 330 kPaG and 40° C. through the gas feed line $L_{16}$.

In addition, the low-pressure $CO_2$ gas 22L containing the rest of the 7% of the total amount of $CO_2$ which has been emitted from the flash drum 21 is fed to the low-pressure compressor 16L at a gas pressure of 50 kPaG and 40° C. through the gas feed line $L_{17}$.

The semi-lean solution 19 emitted from the bottom portion of the high-pressure regeneration tower 15 has a temperature of 120° C. and a pressure of 355 kPaG. Since this temperature is lower than or equal to a deterioration temperature of the amine solution constituting the absorption solution, the absorption solution does not deteriorate. The lean solution 18 emitted from the flash drum 21 has a temperature of 106° C. and a pressure of 60 kPaG.

On the other hand, as in the case of the related art, when the high-pressure rich solution is directly introduced into the high-pressure regeneration tower and the total amount thereof is regenerated, the lean solution which has been regenerated by emitting $CO_2$ in the high-pressure regeneration tower is emitted from the bottom portion at about 150° C. or higher and a pressure of 380 kPaG. Therefore, the lean solution is in the high-temperature state, and the amine solution which is the composition of the absorption solution deteriorates.

In this way, according to the embodiment, the high-pressure rich solution 14 is introduced into the high-pressure regeneration tower 15 and is emitted as the high-pressure $CO_2$ gas 22H from the tower top portion by a portion of $CO_2$ gas 22H, absorbed in the high-pressure rich solution 14, being liberated. This emitted high-pressure $CO_2$ gas 22H is introduced into the high-pressure compressor 16H of the $CO_2$ compression device 16 that is provided on a gas flow downstream side of the high-pressure regeneration tower 15 to compress $CO_2$.

As a result, compression power for compressing $CO_2$ gas, which is emitted from the high-pressure regeneration tower 15, can be significantly saved unlike the related art, and the size of compression facilities can be reduced.

Embodiment 2

Figure 3:
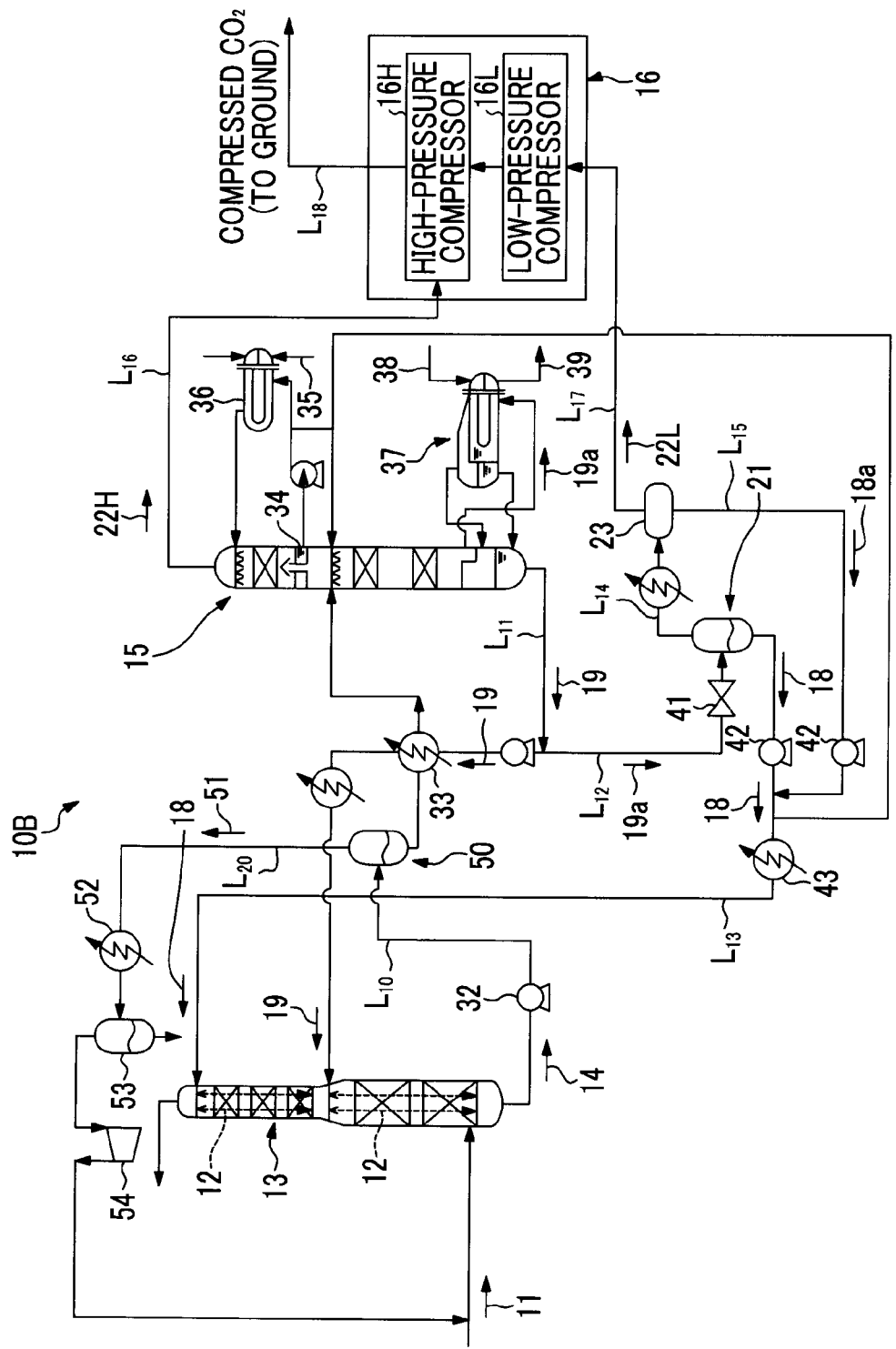
FIG. 3 is a schematic diagram illustrating a $CO_2$ recovery system according to Embodiment 2.

A $CO_2$ recovery system according to an embodiment of the present invention will be described with reference to the drawings. FIG. 3 is a schematic diagram illustrating a $CO_2$ recovery system according to Embodiment 2. The same components as in Embodiment 1 are represented by the same reference numerals, and the description thereof will not be repeated.

As illustrated in FIG. 3, the $CO_2$ recovery system 10B according to the embodiment is the same as the $CO_2$ recovery system 10A according to Embodiment 1 illustrated in FIG. 1, except that an inert gas separator 50 is provided between the liquid feed pump 32 and the heat exchanger 33.

When inert gas is present, the compression purity of $CO_2$ gas cannot be improved because inert gas is non-condensable gas. Accordingly, in the embodiment, inert gas (for example, $N_2$ or $H_2$) present (0.1 wt % or less) in the high-pressure rich solution 14 is removed on an upstream side of the high-pressure regeneration tower 15. The removed inert gas 51 is circulated again to the high-pressure absorption tower 13 through an inert gas circulating line $L_{20}$. In the inert gas circulating line $L_{20}$, a cooler 52, a gas-liquid separator 53, and a compressor 54 are provided.

By providing the inert gas separator 50 to remove the inert gas 51, the purity of compressed and recovered $CO_2$ gas is improved.

In the embodiment, gas-liquid separation is performed using the flash drum, but the invention is not limited thereto. For example, a distillation tower or a separation column may be used for gas-liquid separation.

REFERENCE SIGNS LIST 10A and 10B: $CO_2$ RECOVERY SYSTEM
11: HIGH-PRESSURE GAS

12: $CO_2$ ABSORPTION SOLUTION
13: HIGH-PRESSURE ABSORPTION TOWER
14: HIGH-PRESSURE RICH SOLUTION
15: HIGH-PRESSURE REGENERATION TOWER
16: $CO_2$ COMPRESSION DEVICE
16H: HIGH-PRESSURE COMPRESSOR
16L: LOW-PRESSURE COMPRESSOR
18: LEAN SOLUTION
21: FLASH DRUM
22H: HIGH-PRESSURE $CO_2$ GAS
22L: LOW-PRESSURE $CO_2$ GAS

The invention claimed is:

1. A $CO_2$ recovery system comprising:
a high-pressure absorption tower that brings high-pressure gas containing $CO_2$ into contact with a $CO_2$ absorption solution to remove $CO_2$ from the high-pressure gas;
a high-pressure regeneration tower that liberates a portion of $CO_2$ from a $CO_2$-absorbed high-pressure rich solution, which has been introduced from the high-pressure absorption tower through a first liquid feed line, and partially regenerates the $CO_2$ absorption solution to obtain a semi-lean solution;
a second liquid feed line that extracts the semi-lean solution having a heat resistance temperature thereof or lower from a bottom portion of the high-pressure regeneration tower and introduces a portion of the semi-lean solution into a middle stage of the high-pressure absorption tower to be reused as the $CO_2$ absorption solution;
a branch line that introduce a rest of the semi-lean solution into a flash drum to obtain a normal-pressure lean solution;
a third liquid feed line that introduces the lean solution after adding pressure thereto into a top of the high-pressure absorption tower to be used as the $CO_2$ absorption solution;
a high-pressure $CO_2$ compression device where high-pressure $CO_2$ gas separated in the high-pressure regeneration tower is introduced; and
a low-pressure $CO_2$ compression device where low-pressure $CO_2$ gas separated in the flash drum is introduced.

2. The $CO_2$ recovery system according to claim 1, further comprising:
an inert gas separator that separates inert gas between the high-pressure absorption tower and the high-pressure regeneration tower; and
an inert gas introduction line that introduces the separated inert gas into the high-pressure absorption tower.

\* \* \* \* \*